(No Model.)  J. D. TRACY & J. F. PLATT.  7 Sheets—Sheet 1.
CORN PLANTER.

No. 602,148.  Patented Apr. 12, 1898.

(No Model.) 7 Sheets—Sheet 3.

J. D. TRACY & J. F. PLATT.
CORN PLANTER.

No. 602,148. Patented Apr. 12, 1898.

Witnesses
Inventors
John D. Tracy
James F. Platt
by Attorneys (No Model.)  
7 Sheets—Sheet 4.

J. D. TRACY & J. F. PLATT.
CORN PLANTER.

No. 602,148. Patented Apr. 12, 1898.

Witnesses  
Inventors  
John D. Tracy  
James F. Platt  
by Foster & Freeman  
Attorneys

THE NORRIS PETERS CO., PHOTO-LITHO., WASHINGTON, D. C.

(No Model.) 7 Sheets—Sheet 5.
J. D. TRACY & J. F. PLATT.
CORN PLANTER.

No. 602,148. Patented Apr. 12, 1898.

Witnesses
Inventors
John D. Tracy
James F. Platt
by
Attorneys (No Model.)  7 Sheets—Sheet 7.

J. D. TRACY & J. F. PLATT.
CORN PLANTER.

No. 602,148. Patented Apr. 12, 1898.

Witnesses  
J. G. Hinkel

Inventor  
J. D. Tracy  
J. F. Platt  
Attorneys

THE NORRIS PETERS CO., PHOTO-LITHO., WASHINGTON, D. C.

UNITED STATES PATENT OFFICE.

JOHN D. TRACY AND JAMES F. PLATT, OF STERLING, ILLINOIS; JOHN W. PLATT ADMINISTRATOR OF SAID JAMES F. PLATT, DECEASED.

CORN-PLANTER.

SPECIFICATION forming part of Letters Patent No. 602,148, dated April 12, 1898.

Application filed May 10, 1897. Serial No. 635,927. (No model.)

*To all whom it may concern:*

Be it known that we, JOHN D. TRACY and JAMES F. PLATT, citizens of the United States, residing at Sterling, in the county of Whiteside and State of Illinois, have invented certain new and useful Improvements in Corn-Planters, of which the following is a specification.

This invention relates to certain new and useful improvements in corn-planters; and it consists, substantially, in such features of construction, arrangement, and combinations of parts as will hereinafter be more particularly described.

The invention comprises generally a combined seed-drill and a check-row planter; and the objects of the invention will be fully understood from the following description when taken in connection with the accompanying drawings, wherein—

Our invention is capable of a great many different embodiments, and while we have herein elected to show a certain preferred embodiment it will be understood that we do not limit ourselves as to detail, but that we are at liberty to make such alterations or changes in the general construction and arrangement of parts as may be demanded by the exigencies of any particular case. Thus A represents the side portions, and A' the rear end portion, of the main frame, mounted on the axle or shaft B and supported on the wheels C C. Extending across or transversely of the machine, at the forward end thereof, is the supplemental frame, comprising the bars D D, one of which is pivotally connected to the ends of the portions A of the main frame at D', and at the ends of this supplemental frame are mounted suitable check-row devices E E, which may be of any suitable construction. Also supported in suitable bearings and having proper operative connection with said check-row devices is the usual rock-shaft F, through the medium of which the seed-dropping plates or disks G are intermittently operated.

When employing our machine as a check-row planter, it is desirable that the seed-dropping plates G be operated at each complete stroke of the rock-shaft only; but when employing the same as a drill it is desirable that said plates shall be operated at every half-stroke of said shaft, and hence in the one instance we need only to use one pawl H for each seed-plate, and in the other instance we employ an additional pawl I for each plate. Preferably, however, we have shown two pawls with each seed-plate. These said pawls are pivotally supported upon arms $a$, projecting from the rock-shaft F, and it will be observed that the said pawls are constructed at their ends the one straight and the other with a hook $b$, so that on the forward movement of the rock-shaft the seed-plates will be operated to be pushed around by one set of pawls, and on the return movement of said shaft the plates will be pulled upon or moved in the same direction by the other set of pawls. It will be understood that said seed-plates are arranged to operate in connection with suitable valves (not shown) of any desired construction and located at the bottoms of the seedboxes K, and as the plates are moved intermittently the seed will be caused to pass through to be delivered to the seed chutes or tubes L, through which the seeds pass to the ground. Each of the pivoted pawls is pressed or acted on from beneath by a spring $b'$ to keep the same in proper engagement with the teeth of the plates.

Figure 7:
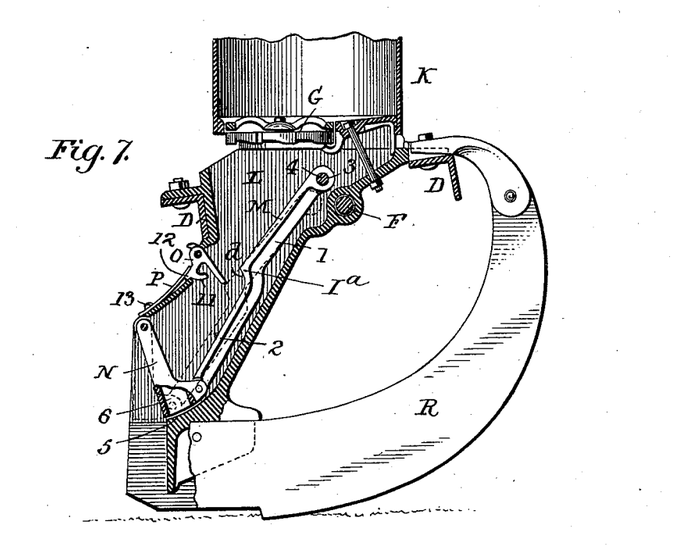
Fig. 7 is a detail view of one of the runners and seed-tubes, the latter being shown in section by which to more clearly represent the arrangement and operation of the discharge-valve for the seed as well as the pitman which actuates the same from a wrist-pin on the rock-shaft.

Many forms of devices could be employed for regulating and controlling the discharge of the seed from the chutes; but preferably we adopt the devices such as we will now describe. Thus, as shown in Fig. 7, M represents a pitman, which is shown bent at $d$ to constitute two surfaces 1 2, a little out of alinement with each other, with an intermediate shoulder $I^a$, and at its upper end this pitman is provided with an opening 3 to receive the end of a wrist-pin 4 upon an arm carried by the rock-shaft, while at its lower end the said pitman is in movable connection with a valve N, pivoted at its upper end to the wall or side of the seed-chute. Said valve is swung in and out to a limited extent by the movements of the pitman, and it operates in connection with a seat 5 and is so bent or constructed at its lower end as to constitute an open pocket 6, into which the seed is practically caught and retained until carried off by the working or operation of the pitman. The wrist-pin 4, on which the upper end of the pitman is suspended, works in a curved slot 7 in the side of the seed-chute, and it is evident that the said pitman will have a reciprocating movement imparted thereto, while at the same time it will be given a slight swinging movement bodily within the chute. Movably supported in the upper side of the said seed chute or tube L is a cut-off valve O, in connection with which there is a flat or other suitable spring P for holding the valve in either its closed or open position, and when closed said valve rests in contact with the surface of the pitman and prevents the passage of the seed to the pivoted discharge-valve below. Supposing the machine to be operated as a check-row planter, the seed will be delivered to the chute from the upper valve through the seed-plate, and if the pitman is in the position shown in Fig. 8 the seed will be caught and retained by the cut-off valve O until the pitman is moved by the rock-shaft to the position shown in Fig. 9, whereupon the seed will fall into the open pocket 6 of the valve and will be retained on the seat 5 until the pitman is again lowered to the position shown in Fig. 8, by which latter movement the seed will be carried off the seat by the swinging valve and will fall or drop to the ground.

Figures 8, 9, 10:
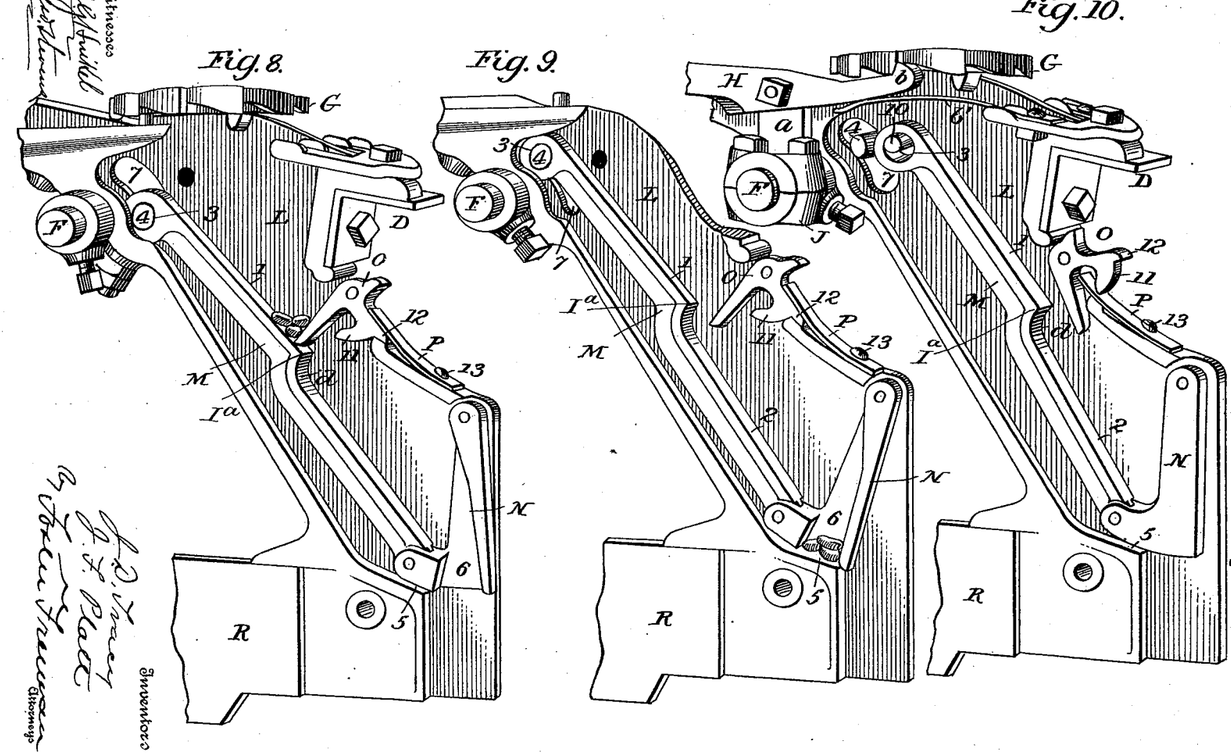
Fig. 8 is a view in perspective of the interior of one of the seed chutes or tubes, said view indicating the reciprocating pitman, discharge-valve, and cut-off valve which constitute the seed operating and controlling devices.
Fig. 9 is a similar view showing the parts on the interior of the chute in a different position.
Fig. 10 is also a similar view showing the seed-operating pitman disconnected from the rock-shaft and both the cut-off and discharge valves in an open position.
Figure 11:
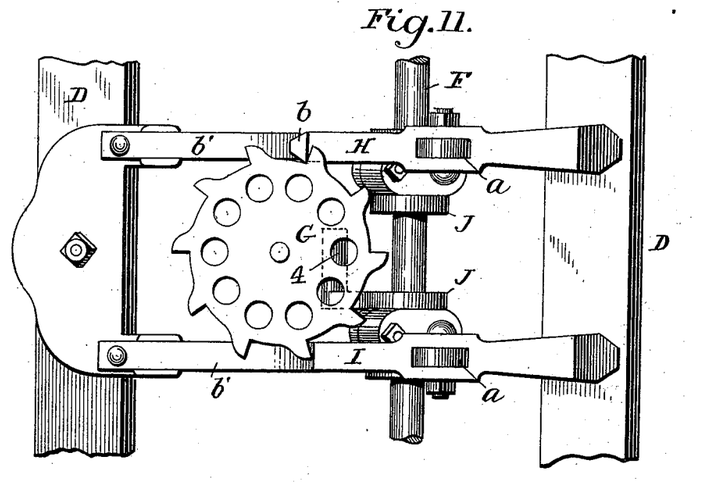
Fig. 11 is a detail plan view of one of the seed-dropping plates and its operating mechanism.
Figure 12:
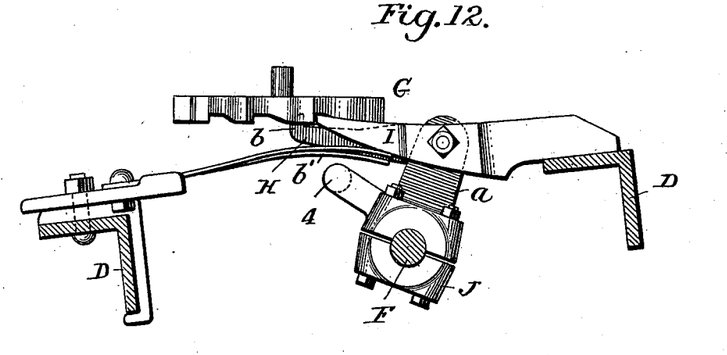
Fig. 12 is a side view thereof.

When it is desired to operate as a seed-drill, the check-row devices are disconnected, and the upper end of the pitman M is detached from the wrist-pin 4 of the rock-shaft and hung upon a pin 10, fitted in the side of the seed tube or chute, and at this time the cut-off valve O is turned down to the position shown in Fig. 10, so as to permit uninterrupted discharge of the seed at the end of said chute. The said cut-off valve is formed with a curved arm 11, having a thumb-piece 12, and the spring P is secured in place by a screw or rivet 13, and, according as the valve is turned to one position or the other, the spring engages the same substantially as shown in the several figures of drawings referred to. It is of course apparent that the details of construction and arrangement of these devices could be changed in immaterial respects without departing from the spirit of our invention.

It is desirable that whenever the runners R are raised or elevated from the ground the action of the seed-plates shall cease, so that when the operator arrives at the end of a row with the planter he is not obliged to stop to throw the drill out of gear, and he is at full liberty to attend to his team in making the turn. To effect this desirable feature, it involves suitable means whereby during the operation of drilling the rock-shaft will be carried back and forth to properly actuate the seed-plates, as well also as means whereby when the runners are elevated the operative connections with the rock-shaft will be temporarily broken, but again formed as soon as the runners are again lowered. These operations and results could be effected in many different ways, but preferably we employ the devices or mechanism which we will now describe.

As shown in the drawings, a drive sprocket-wheel S is attached to the hub or spokes of one of the supporting-wheels C, and said sprocket-wheel connects, by means of a sprocket-chain T, with a sprocket-pinion U, carried on one end of a short crank-shaft V, the other end of said shaft having a crank V', to which is connected one end of a pitman or connecting-rod W. The forward end of said rod is provided at the side with a pin 14, which enters an oblong slot 15 in a slide 16, which has a rearward shank or stem 17, moving in a slot of an arm 18, secured to the side of one of the frame portions A, and the said slide is in movable connection at its forward end with a crank or arm 19, that is clamped to the rock-shaft. As thus constructed and arranged it is evident that as the pitman or connecting-rod W is reciprocated back and forth there will be no movement imparted to the rock-shaft F, since the pin 14 on the rod will move back and forth in the slot 15 in the slide 16, and the slide will likewise remain practically stationary with the shaft or without movement. In order, however, that the movements of said pitman or connecting-rod be imparted to the rock-shaft (and consequently the seed-plates) when the runners are down, we provide a suitable locking device for the purpose, and while this could be variously constructed and arranged we preferably employ a latch-piece 20, that is pivoted at 21 to the shank or stem 17 of the slide, and which latch-piece is formed or provided at its forward end with a hook or catch 22, which when the runners are down rests upon the pin 14, projecting from the side of said connecting-rod. The said latch-piece has a downwardly-projecting hook 23, which engages with the pin 14 on connecting-rod W to bring the arm 19 to its position, so that the latch can drop into place, and the slide is provided with a guide 24 to hold the latch from working sidewise relative to the slide. The latch-piece is also provided at its rearward portion, on the under side, with a lifting-arm or cam 25, adapted to be engaged by a rail D of the frame as the latter is elevated. It will now be seen that when the latch-piece is in engagement with the pin on the connecting-rod W the movements of the latter will be imparted to the rock-shaft, and the slide 16 and the latch-piece will also move back and forth, with the stem or shank of the slide working in the slot of the arm 18. When it is desired to elevate the runners together with the forward end of the frame, the hand-lever Y is operated to be drawn backward, and then as the frame rises the inner rail D thereof engages the cam or lifting-arm 25 of the latch-piece, and the latter is also lifted upward and disengages with the connecting-rod. As soon as disconnection of said latch-piece is effected the pin of the connecting-rod begins to reciprocate in the slot of the slide and the rock-shaft is temporarily stopped. In this way the dropping of the seed through the seed-plates is also temporarily stopped, and it will be seen that the arrangement possesses considerable advantage. As soon as the frame and runners are again lowered to the ground the engagement of the latch-piece is effected automatically in an obvious manner.

The raising and lowering of the frame and runners could be effected in different ways; but preferably we construct the operating-lever Y with a lower curved extension Y' and connect it to the axle B, as hereinafter described, and we pivotally support the said lever in an opening Z of a short tongue 30 by means of a bolt or pin 31, passing through the tongue, as shown. The said lever also works between two segments 32 33, secured to the top of the tongue on opposite sides of the opening Z therein and which serve as a guide for the lever, and one of said segments constitutes a curved toothed rack 34, in which engages the catch or bolt 35, carried at the lower end of a slide $y$, moved by the auxiliary hand-lever $Y^2$ and rod $Y^3$, which latter is pivoted at 36 to the slide on the main lever. If desired, the extremity of the extension Y' of the main lever is provided with a foot-rest 37 for the feet of the operator, and said extension is connected with the main shaft by means of a clamp or link 38.

Figure 1:
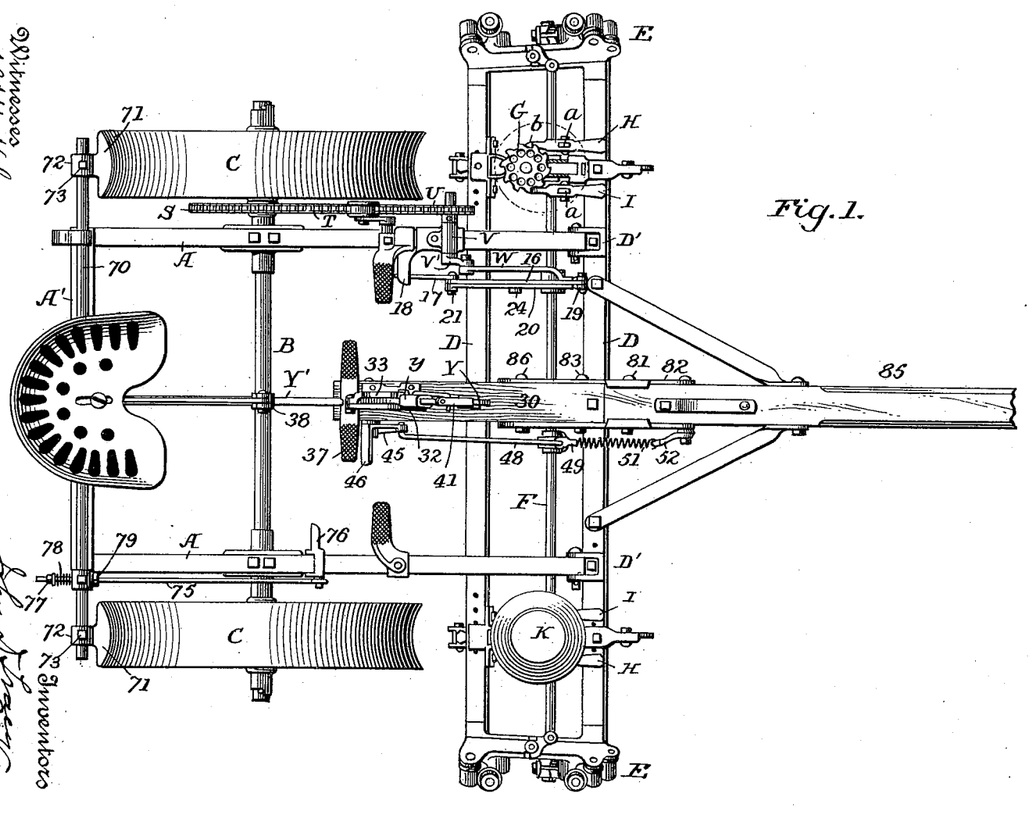
Figure 1 is a top or plan view of a corn-planter constructed and arranged in accordance with our invention.
Figure 2:
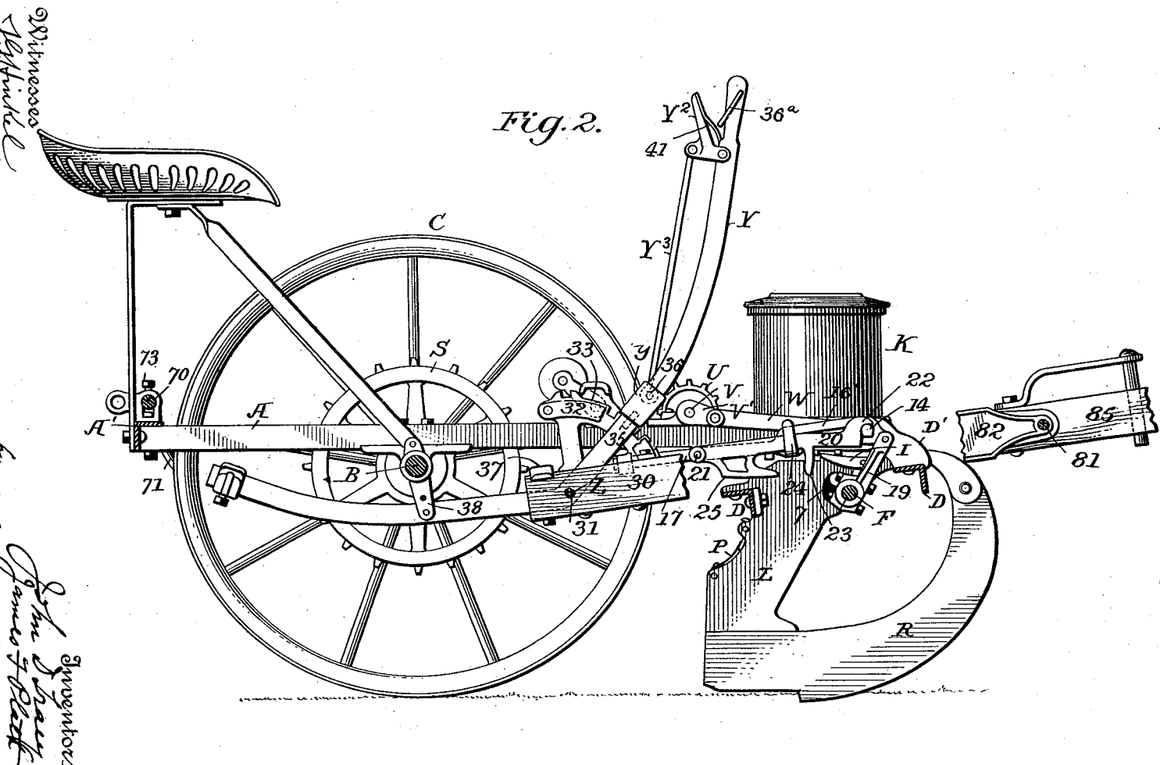
Fig. 2 is a side view thereof in part section, the runners being shown in position upon the ground.
Figure 3:
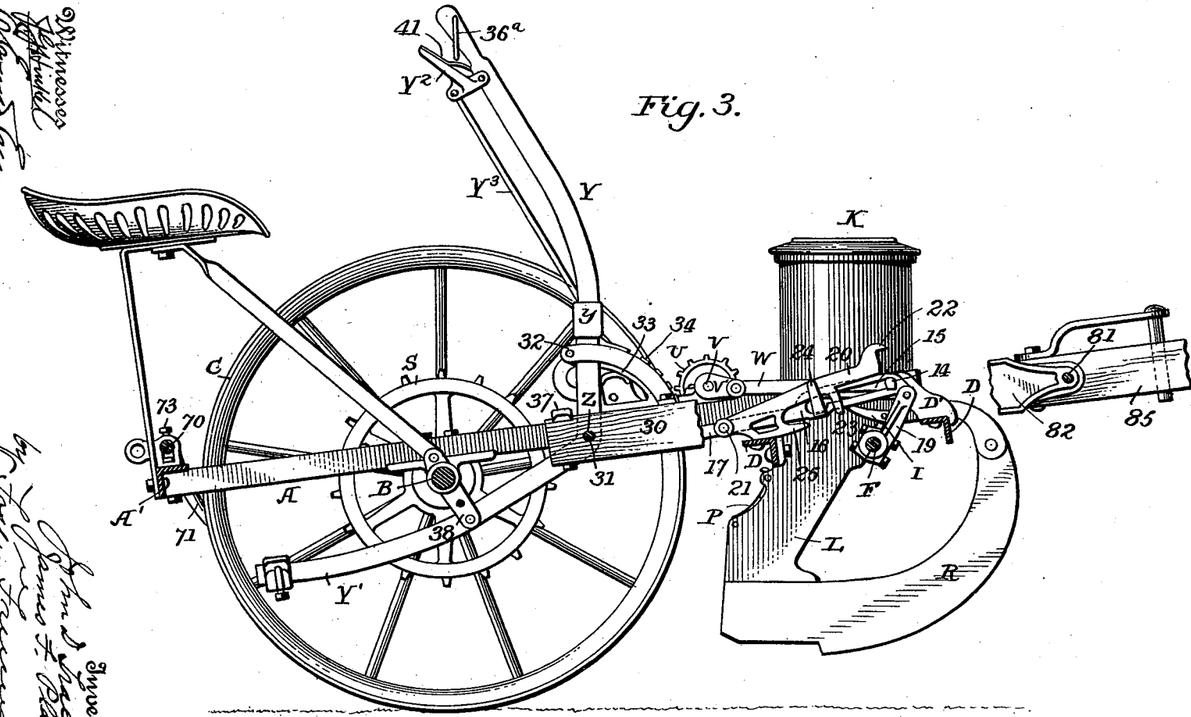
Fig. 3 is a similar view to Fig. 2, the runners being shown as elevated from the ground and the seed-dropping devices as thrown out of action.

The auxiliary lever $Y^2$ is pivotally connected to the main lever Y at its upper end, and when it is grasped and carried close against the grip or handle portion of the main lever the catch or bolt 35 will be released from engagement with the segmental rack 34, and the frame and runners carried thereby will be raised or lowered by carrying the hand-lever back or forth, according to the previous position of the parts. Figs. 2 and 3 represent the several parts in their lowered and raised positions, respectively.

In order to maintain the catch or bolt 35 out of engagement with the rack, we provide a loop $36^a$, which is pivoted to the upper end of the main lever and which is adapted to embrace the auxiliary lever $Y^2$ and hold the same against the pressure of the spring 41. In this way the planter-frame will be allowed to rest on the ground and conform to unevenness thereof, and thus insuring the planting at an equal depth.

Figure 4:
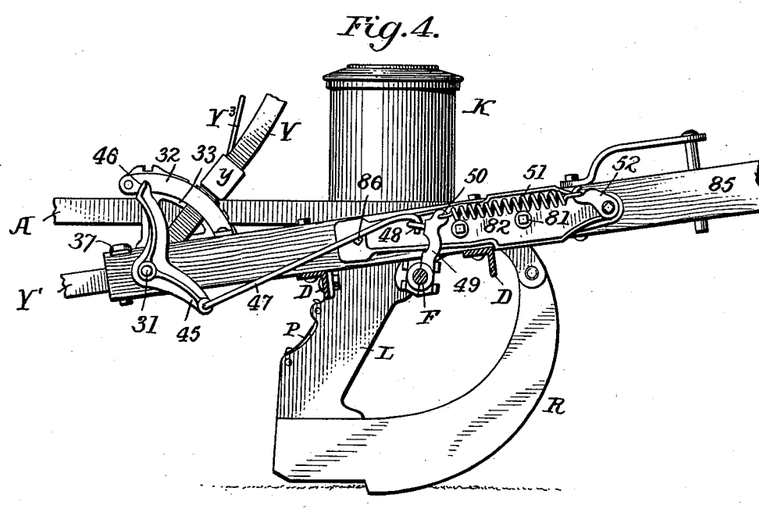
Fig. 4 is a detail view in side elevation to represent more clearly the devices or mechanism for operating the rock-shaft by the foot of the driver or operator.

At times when the check-rower devices cannot be used to operate the rock-shaft while planting in hills it is desirable that the said shaft be capable of being operated in substantially the same way by means of hand or foot power, and while various devices could be employed for this purpose we have devised a special means which possesses many advantages. Thus, as shown in Fig. 4, on the same bolt or pin 31 upon which the main hand-lever is pivoted we pivot a crank 45, the upper arm of which has a foot-piece 46 and the lower arm of which is in movable connection with one end of a rod 47, the other end of which is in similar movable connection at 48 with a crank or arm 49 on the rock-shaft, and also attached to this crank or arm at 50 is one end of a coiled spring 51, the opposite end of which is fastened to a hook or catch 52, secured to the side of the tongue. It will thus be seen that by pressing upon the crank 45 with the foot the rock-shaft will be moved back, and each time the pressure of the foot is taken from the crank the action of the spring 51 will carry the rock-shaft forward. The said spring is always used when planting in check-rows, whether the check-row devices are used or not, but it is not used when drilling. By very slight changes the present devices could be converted into a hand-drop instead of a foot-drop, and, if desired, an extra seat could be provided for a boy for such purpose. We have not deemed it necessary, however, to show this arrangement.

Figure 5:
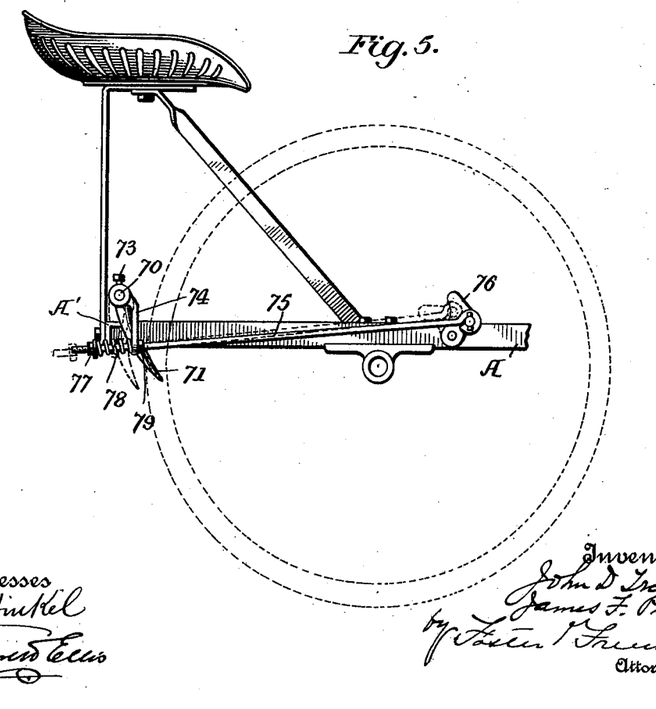
Fig. 5 is also a detail view to show the scrapers and the devices by which the same are thrown into and out of contact with the wheels.

Another feature of our improvements is the construction and operation of the scrapers for the wheels, and in carrying out this part of our invention we arrange across the rear of the machine, in suitable bearings on the side pieces of the frame, a rock-shaft 70, to which is secured near each end a scraper or blade 71, of a shape conforming to the rim of the wheel the said scrapers or blades being each provided with a hub 72 to fit the shaft to which it is held by means of a set-screw 73. Also supported by said shaft in substantially the same way and attached to the frame is a downwardly-projecting arm 74, through which passes the rear end of a connecting-rod 75, the forward end of which extends somewhat beyond the main axle and being in movable connection with a yoke-lever 76, embracing the side portion of the frame and adapted to be operated by the foot of the driver. The rear end of said rod 75 is screw-threaded for a suitable distance, and between the arm 74 and a nut 77 on the rod is a coiled spring 78, and to the opposite side of the arm is another nut 79. By turning these nuts the springs on the rods are made to exert a greater or less degree of tension upon the scrapers or blades, and the latter are accordingly made to bear against the rims of the wheels with corresponding pressure.

To operate the scrapers, the driver simply places one foot upon the yoke-lever and pushes the latter forward, whereupon the edges of the scrapers will be carried against the wheels in an obvious manner. It will thus be seen that the scrapers are adjustable and that in order to hold them in contact with the wheels the driver is not obliged to keep his foot on the operating-lever, as is very often the case with other planters. When the foot-lever is thrown forward it becomes locked and the springs on the connecting-rods maintain the desired tension upon the scrapers. The locking of said foot-lever is accomplished by bringing the crank 76 a little below the swing or pivotal point of the crank, and the latter is prevented from turning only so far (a little below its center) and no pressure upon the scraper can raise it.

Figure 6:
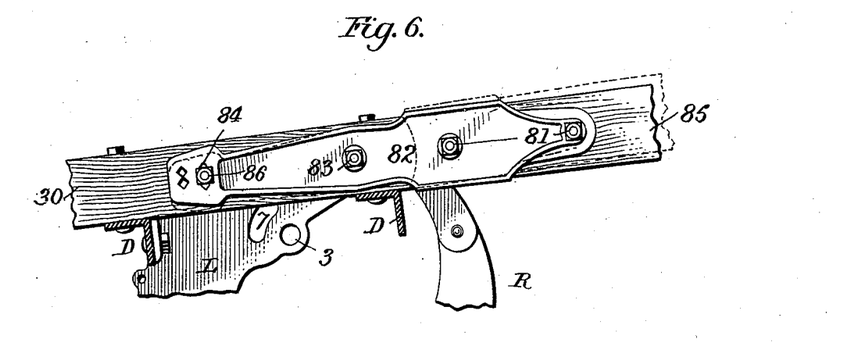
Fig. 6 is a detail view showing the construction and arrangement of devices for raising or lowering the relative position of the draft-pole.

Still another feature of our invention resides in the means for adjusting and regulating the height of the pole or tongue 85 at its outer end, and for which purpose we secure to each side of the tongue 85, by means of bolts 81, a plate 82, and pivotally mounted on the bolt 83 is the short tongue 30, having a series of holes corresponding to a series of holes 84 in the rear ends of the plates, adapted to receive a fastening-bolt 86. Whenever it is desired to adjust the pole or tongue vertically, it is simply necessary to remove the fastening-bolt 86 and move the pole or tongue on the pivotal bolt 83 and then to replace said bolt 86 in the proper opening or hole 84, and in this way the parts will be securely held together in their adjusted relation. By this simple means adjustments can be readily effected to suit the different heights of horses and to retain the dropping mechanism in check whether high or low horses are employed.

From the foregoing it will be seen that means are provided for simultaneously actuating the feed-plates at every half-stroke of the rock-shaft, and it is evident that we are not limited to the construction of feed-plate nor to the means which directly engage the same. Neither are we compelled to use a horizontally-arranged plate, and the connections from the shaft may be also considerably varied in many respects. By the construction and arrangement shown, however, the rock-shaft is not required to be run at as high a rate of speed as when a single pawl is used in drilling, as heretofore. The action of the seed-plates is also slower and a better opportunity is had for the seed to get into the dropping devices, thus insuring regular discharge and even drilling of the seed.

When planting in check-rows, whether the rock-shaft be operated from the check-row wire in the usual way or whether the same is operated by means of the foot devices described, the pitman M in the seed chute or tube L will be operated in conjunction with the cut-off and discharge valves, substantially as has been explained in reference to Figs. 7 to 10.

It is evident, further, that the said pitman may be constructed and operated in different ways and that instead of bending the same so as to constitute two arms it may be practically straight throughout. Said pitman is described as being operated by a wrist-pin on the rock-shaft; but it may be operated from any other part of the machine at the proper intervals, and the connections therefor may of course be varied within reasonable limits. The cut-off valve and discharge-valve operating in connection with said pitman may each also be varied in construction, and said cut-off valve is preferably located centrally in the seed-chute and it is readily accessible to be opened or closed. When detached from operative connection with the rock-shaft or other actuating device, said pitman may be hung up or suspended within the chute in any suitable way.

The means for effecting the locking engagement of the driving-pitman W with the rock-shaft are such as have been found useful and advantageous in actual practice, and for such reason we have elected to show them; but it will be obvious that various changes in the construction and arrangement of such means may be made without departing from the spirit or scope of our invention. In fact, we do not wish in any instance to be understood as limiting ourselves precisely to the several embodiments which we have herein elected to show.

We claim—

1. In a corn-planter, the combination with the seed-plate, of a rock-shaft provided with two projecting arms a pawl pivotally mounted upon each arm of the rock-shaft for imparting movement to the seed-plate at each half-stroke of said shaft, substantially as described.

2. In a corn-planter, the combination with the rock-shaft, and the seed chute or tube, of a reciprocating pitman in the tube operated by the shaft, a seed-cut-off valve, a discharge-valve in movable connection with the lower end of said pitman, and a seat upon the seed-chute for said discharge-valve, substantially as described.

3. In a corn-planter, the combination with the rock-shaft, and the chute or tube, of a reciprocating pitman in the tube and formed with two surfaces out of alinement with each other, a cut-off valve in the tube adjacent to the intersection of the two surfaces, and a pivoted discharge-valve at the lower end of the tube and in movable connection with the pitman, and a seat for the discharge-valve, substantially as described.

4. In a corn-planter, the combination with the rock-shaft, of a seed chute or tube, a reciprocating pitman in the tube operated from the rock-shaft, a discharge-valve formed with an open pocket communicating with the seed-chute at one end, said valve being adapted to a seat upon the seed-chute and connected to the pitman to be moved thereby from its seat to open the discharge end of the pocket, substantially as described.

5. In a corn-planter, the combination with the rock-shaft, and the seed chute or tube, of a reciprocating pitman in the tube operated by the shaft, a discharge-valve in movable connection with the lower end of said pitman and comprising an open pocket, a seat for said valve, and a cut-off valve intermediate the ends of the pitman, substantially as described.

6. In a corn-planter, the combination with the rock-shaft, and the seed chute or tube, of a reciprocating pitman in the tube operated by a wrist-pin on the shaft, a discharge-valve in movable connection with the lower end of said pitman and comprising an open pocket, a seat for said valve, a cut-off valve intermediate the pocket and wrist-pin, and means for holding the latter valve in its open and closed positions relative to the pitman, substantially as described.

7. In a corn-planter, the combination with the rock-shaft having the wrist-pin, and the seed chute or tube, of a reciprocating pitman in the tube operated from the wrist-pin, a discharge-valve in movable connection with the lower end of said pitman and comprising an open pocket, a seat for said valve, a cut-off valve, and a spring for holding the latter in its open and closed positions relative to the pitman, substantially as described.

8. In a corn-planter, the combination of the main frame, the rock-shaft and the seed-plates operated by the latter, the pitman-rod and crank-shaft for operating the rock-shaft, and a movable locking device for maintaining said pitman in operative connection with the rock-shaft when the frame is down, and for releasing or breaking such connection on the raising of the frame, substantially as described.

9. In a corn-planter, the combination with the main frame, the rock-shaft and seed-plates operated by the latter, of a crank-shaft and a pitman for operating the rock-shaft, and a pivoted latch and a slide for maintaining the pitman in operative connection with the rock-shaft when the frame is down, and for releasing or breaking said connection on the raising of the frame, substantially as described.

10. In a corn-planter, the combination with the main frame and the rock-shaft, of a slotted slide in movable connection with said shaft, a reciprocating pitman, and means for locking the pitman to the slide when the frame is down and for unlocking the same on lifting the frame, substantially as described.

11. In a corn-planter, the combination with the main frame and the rock-shaft, a reciprocating pitman, an arm on the shaft, a slotted slide working in a guide on the frame and in connection with said arm, a pivoted latch for locking the slide and pitman together when the frame is down, and means for unlocking the same on raising the frame and permitting the pitman to work idle in the slot of the guide, substantially as described.

12. In a corn-planter, the combination with the main frame and the rock-shaft, of a reciprocating pitman, a reciprocating slide in connection with said shaft and having a longitudinal slot, a latch-bar pivoted to the slide and constructed at its forward end to engage a stud on the pitman, the said latch and slide having engaging guide-arms, and means on the frame for raising the latch as the frame is lifted, substantially as described.

13. In a corn-planter, the combination with the wheels, of a rock-shaft to the rear thereof, adjustable scrapers or blades on said shaft, an arm on the shaft, a connecting-rod passing through the arm, a spring and adjusting-nuts, and a lever operated by the foot of the driver, substantially as described.

In testimony whereof we have signed our names to this specification in the presence of two subscribing witnesses.

JOHN D. TRACY.
JAMES F. PLATT.

Witnesses:
A. S. GOODELL,
A. B. TITUS.